United States Patent [19]

Grathoff

[11] Patent Number: 5,632,370
[45] Date of Patent: May 27, 1997

[54] PIVOTING TRANSFER MEANS AT BELT CONVEYOR

[75] Inventor: Hartmut Grathoff, Wendelstein, Germany

[73] Assignee: MAN Gutehoffnungshütte Aktiengesellschaft, Oberhausen, Germany

[21] Appl. No.: 401,724

[22] Filed: Mar. 9, 1995

[30] Foreign Application Priority Data

Mar. 17, 1994 [DE] Germany .......................... 44 09 152.4

[51] Int. Cl.⁶ .................................................. B65G 21/10
[52] U.S. Cl. ..................... 198/587; 198/604; 198/607; 198/626.2
[58] Field of Search ................................. 198/587, 604, 198/605, 607, 626.2, 626.4; 414/139.1, 140.2, 140.9, 142.1, 142.2

[56] References Cited

U.S. PATENT DOCUMENTS

| | | | |
|---|---|---|---|
| 1,991,652 | 2/1935 | Bean | 198/587 |
| 3,339,710 | 9/1967 | Micgielse et al. | 198/587 |
| 4,230,220 | 10/1980 | Iino | 198/604 |
| 4,459,077 | 7/1984 | Franke | 198/587 |
| 4,732,264 | 3/1988 | Engst | 198/605 |
| 5,320,471 | 6/1994 | Grathoff | 414/142.2 |

FOREIGN PATENT DOCUMENTS

| | | | |
|---|---|---|---|
| 22 36 102 | 7/1972 | Germany | B65G 15/16 |
| 34 29 940 | 8/1984 | Germany | B65G 15/16 |
| 41 25 109 | 7/1991 | Germany | B65G 67/60 |
| 41 38 266 | 11/1991 | Germany | F16B 1/02 |
| 41 38 226 | 11/1991 | Germany | B65G 15/16 |

*Primary Examiner*—Joseph E. Valenza
*Attorney, Agent, or Firm*—McGlew & Tuttle

[57] ABSTRACT

A pivoting transfer means for a jet of bulk material between a first cover belt conveyor and a second cover belt conveyor. The bulk material leaves the cover belt conveyor in the area of the tail pulleys and enters the receiving mouth of a second cover belt conveyor as a free jet of bulk material. Both cover belt conveyors are arranged pivotably in relation to one another around a pivot axis. The receiving mouth of the cover belt conveyor is limited by the bottom belt, the cover belt and the side walls. The jet of bulk material is deflected from the vertical into the horizontal direction of delivery within the receiving mouth. The first belt conveyor may be arranged at a higher level with the second cover belt conveyor arranged thereunder. However, the second cover belt conveyor may also be arranged at a higher level with the first cover belt conveyor arranged thereunder wherein the transfer is still from the first cover belt conveyor to the second cover belt conveyor.

8 Claims, 5 Drawing Sheets

(PRIOR ART) Fig. 1

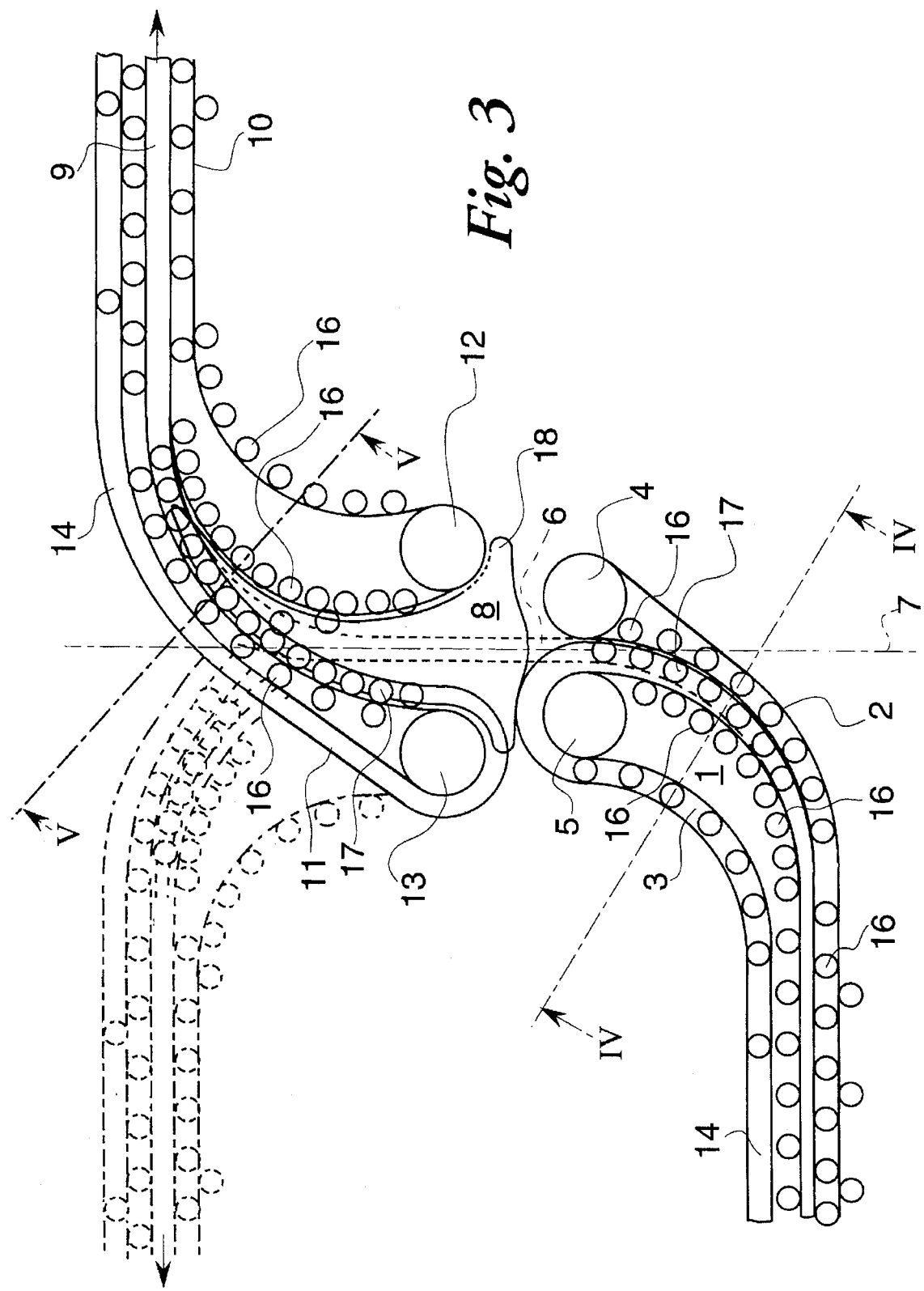

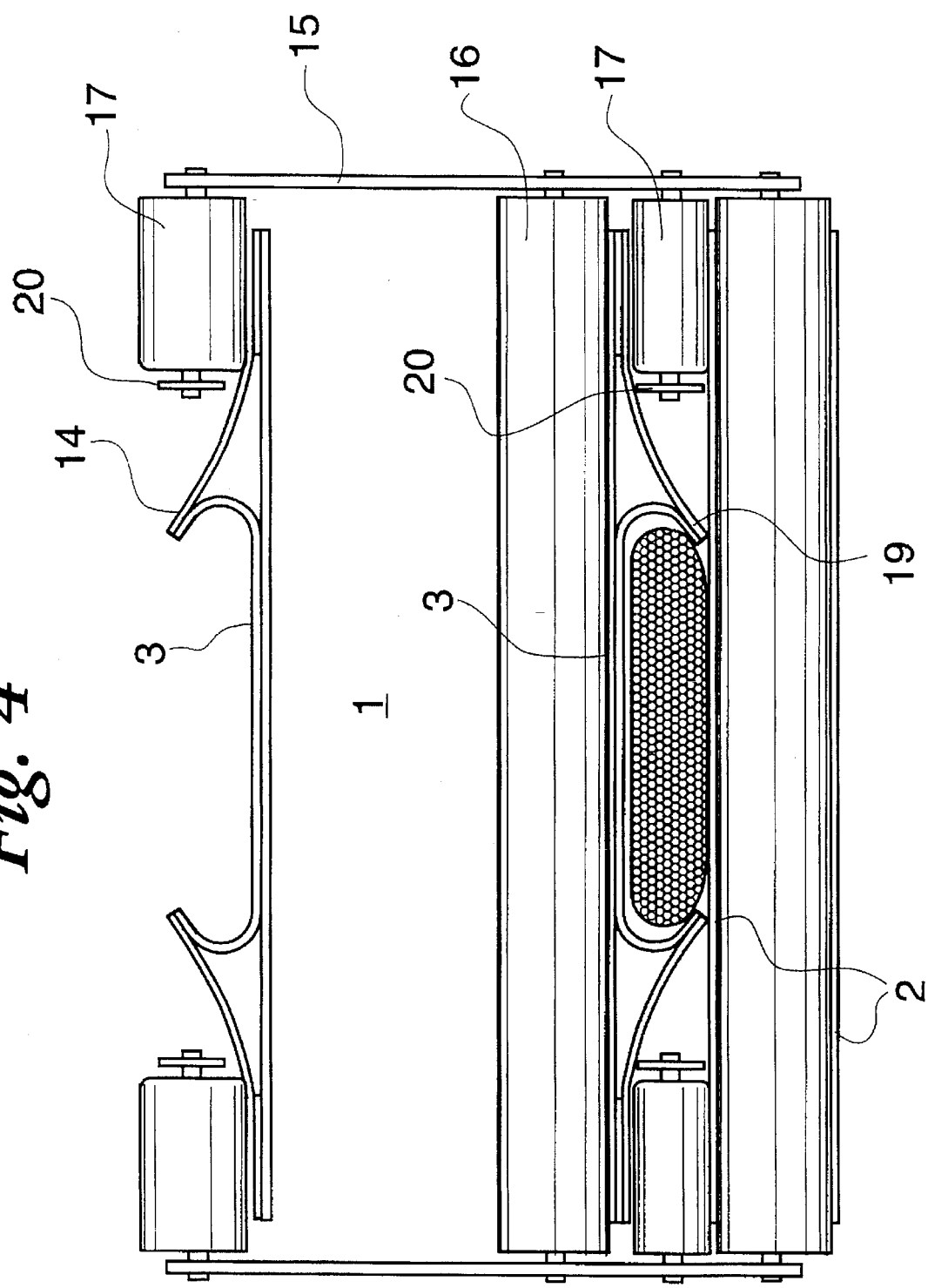

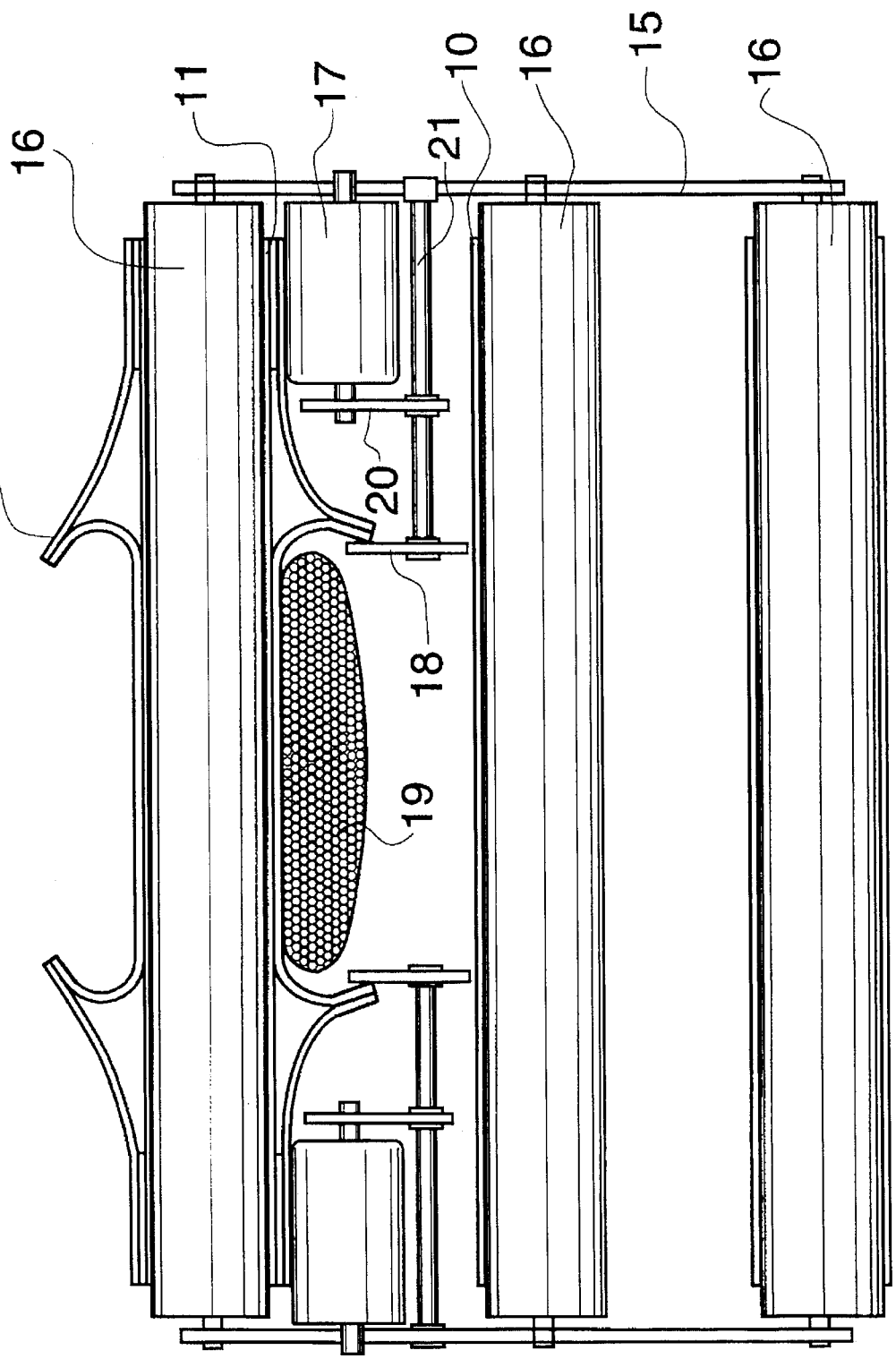

PIVOTING TRANSFER MEANS AT BELT CONVEYOR

FIELD OF THE INVENTION

The present invention pertains to a pivoting transfer means between a belt conveyor arranged at a higher level and a second belt conveyor arranged at a lower level, on the one hand, and between a first belt conveyor arranged at a lower level and a second belt conveyor arranged at a higher level, on the other hand.

BACKGROUND OF THE INVENTION

The prior-art pivoting transfer means of belt conveyors for bulk material are usually designed as follows:

The bulk material arriving from a first belt conveyor is thrown against a baffle plate, which is arranged at a short distance behind the vertical pivot axis. As a result, the horizontal velocity component of the bulk material is reduced to zero over the shortest possible distance. As a consequence of the force of gravity, the bulk material is accelerated in the downward direction, and the bulk material at the same time obtains a small horizontal velocity component against the original direction of delivery due to the rebound force as well as to fluidic effects.

The baffle plate is arranged such that the downwardly directed jet of bulk material will arrive as accurately as possible in the vertical pivot axis of the second belt conveyor. The vertical velocity component is again reduced to zero over the shortest possible distance there. The bulk material is then again accelerated by its own weight and by friction in the direction of delivery of the second belt conveyor, until it reaches the velocity of the second belt conveyor after a certain acceleration section (on the order of magnitude of 1 to 5 m).

To guide the bulk material, chutes are arranged in the area of the belt conveyor, besides the baffle plate.

The disadvantage of this design is the fact that large amounts of energy are inherently continuously destroyed by friction and converted into heat in the area of the pivoting transfer means. The baffle plate, the chutes and the rubber belt of the second belt conveyor are subject to intense wear. Therefore, they require frequent maintenance and replacement, or they must be frequently equipped with new wear material. The lost energy must continuously be applied by the belt drives.

Since the force of gravity is utilized between the first and second belt conveyors, the direction of delivery must always be from the discharge end of the first belt conveyor, which discharge end is arranged at a higher level, to the second belt conveyor. Consequently, the direction of delivery cannot be reversed, unless the height positions of the belts are reversed.

Pivoting transfer means are defined as means in which the second belt conveyor is arranged pivotably around a vertical axis in relation to the first belt conveyor, or in which the direction of delivery of the second belt conveyor is or can be different from that of the first belt conveyor from a bird's eye view.

SUMMARY AND OBJECTS OF THE INVENTION

The object of the present invention is to provide bulk material transfer means from a first belt conveyor to a second belt conveyor, which are free from wear and losses of energy to the extent possible, have low weight, require little space, generate the smallest possible amount of dust, and in which there is no risk of spilling.

According to the invention, a pivoting transfer device for bulk material is provided between a first belt conveyor and a second belt conveyor. The first belt conveyor is arranged at a higher level than the second belt conveyor. A bulk transfer area is provided where bulk material is transferred from the first belt conveyor to the second belt conveyor. The first belt conveyor is provided in the form of a cover belt conveyor which has a bottom belt with a tail pulley and a cover belt with a tail pulley in the bulk material transfer area. The second belt conveyor is a cover belt conveyor which has a bottom belt with a tail pulley, a cover belt with a tail pulley, as well as a receiving mouth formed by side walls provided in the bulk transfer area. The last part of the first cover belt conveyor is deflected in an arc of substantially 90 degrees such that a center of gravity line of a jet of raw material leaving the first conveyor belt is identical to a pivot axis. The second cover belt conveyor describes an arc substantially equal to 90 degrees in a transition beginning from its receiving mouth. The two cover belt conveyors are arranged pivotably in relation to one another around the pivot axis.

The cover belts preferably have compressible beads made in one piece with the cover belts in a known manner with acute angles, extending to the outside.

According to a further aspect of the invention, the first belt conveyor is arranged at a lower level and the second belt conveyor is arranged at a higher level. With this arrangement, the last part of the second cover belt conveyor is deflected in an arc of substantially equal to 90 degrees such that the center of gravity line of the jet of bulk material leaving the second cover belt conveyor is identical to the pivot axis. The first conveyor belt describes an arc substantially equal to 90 degrees in a transition beginning from the receiving mouth and the two cover belt conveyors are pivotable in relation to one another around the pivot axis. With this arrangement, the belt speed of the first cover belt conveyor must be so high that the jet of bulk material will not come to a standstill within the receiving mouth of the second cover belt conveyor as a consequence of the force of gravity, so that the jet of bulk material would not fall back before the bulk material is caught between the bottom belt and the cover belt of the second cover belt conveyor and is carried in a non-positive manner.

Providing a pivoting transfer means transferring from a cover belt conveyor arranged at a lower level to a cover belt conveyor arranged at a higher level is a further object of the invention. The first belt conveyor, which is designed as a cover belt conveyor, is deflected downward in its last area from the horizontal into the vertical direction in an arc of ca. 90°, so that the center line of the jet of bulk material discharged is identical to the pivot axis.

The cover belt conveyor conveying in the downward direction forms a wedge-shaped receiving mouth for the bulk material with its two belts and with two side walls at the material-receiving end. The belt conveyor conveying two side walls at the material-receiving end. The belt conveyor conveying in the downward direction is deflected in its first area from the downwardly directed vertical direction into the horizontal direction in an arc of ca. 90°. The center line of the material-receiving mouth is also located in the pivot axis.

At least the last area of the first cover belt conveyor and the first area of the second cover belt conveyor have a bottom belt and a cover belt each. The second cover belt conveyor forms the receiving mouth known from DE 41,25, 109, which is formed between tail pulleys of the bottom and cover belts, which tail pulleys are arranged at spaced locations from one another.

The cover belt conveyors may be designed as described in, e.g., DE 41.38.266.

The support rollers supporting the cover belt in the straight area are spring-mounted in the cover belt conveyor used here. The support rollers are not spring-mounted in the arc area, because the bulk material is pressed by the centrifugal force against the outer belt of the arc here, so that the material is also carried in a non-positive manner.

In principle, both cover belt conveyors may be designed as described in DE 34.29.940, in which the support rollers of one side are also spring-mounted in the straight part, or as described in DE 22.36.102, in which all support rollers are rigidly mounted, and in which the pressure exerted on the bulk material is brought about, however, by the elasticity of a foam belt.

In the cover belt conveyor according to DE 41.38.226, the bottom belt is a standard smooth conveyor belt, preferably a textile belt. The cover belt is composed of parts not reinforced in the longitudinal direction. A longitudinally rigid strip is installed in the two edge zones only.

In the area of the receiving mouth, the concavely curved belt is supported on the inside by short support rollers at the edges only, and it is supported on the outside by long support rollers, which are somewhat longer than the width of the belt. The return strand of this belt is also supported on some of these long support rollers.

No substantial belt tension is usually required in the cover belt. In the concave area, the cover belt can therefore be partially guided by the short support rollers in the concave area only. If stronger belt forces are present, the belt should be designed with transverse reinforcement.

If the ratio of the tangential force to the perpendicular force is smaller than the coefficient of friction between the belt and the bulk material, the bulk material is carried by the belt without sliding if it arrives on the belt at the same velocity at which the belt is moving.

The receiving mouth of the second cover belt conveyor forms approximately a square in the area between the lower tail pulleys and the frontmost edge of the side walls. The edge length of this square is greater than or equal to the maximum width of the jet of bulk material leaving the first cover belt conveyor.

The first and second cover belt conveyors normally have the same cross-sectional dimensions. To ensure that the bulk material filling in the second cover belt conveyor is not broader than in the first one, the two side walls of the receiving mouth are directed in a slightly funnel-shaped pattern when viewed in the direction of the first cover belt conveyor. At the end viewed in the direction of delivery, the distance between the side walls corresponds to the width of the intended bulk material filling.

As an alternative, in a variant of the present invention, a similarly designed pivotable bulk material transfer means from a first cover belt conveyor into a second cover belt conveyor can be designed, in which the direction of delivery is, however, from the lower to the upper cover belt conveyor. This is possible if the speed of delivery is high enough for the bulk material in the second cover belt conveyor arranged at a higher level to be compressed and non-positively carried between its two belts. To achieve this, the speed of delivery must be greater than $$\sqrt{2gh}$$

in which "g" is the gravitational acceleration, and "h" is the height or the path traveled by the bulk material after leaving the first cover belt conveyor to the point at which it is caught in the second cover belt conveyor in a non-positive manner.

As soon as particles of bulk material reach the convexly curved cover belt located on the outside of the curve within the material-receiving mouth of the second cover belt conveyor, they are deflected by that cover belt and are pressed against it by the centrifugal force. The bulk material is accelerated or decelerated to the speed of the cover belt conveyor by the centrifugal force and the coefficient of friction between the bulk material and the belt.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a section through a pivoting transfer device with a first belt conveyor located at a lower level;

FIG. 4 is a section VI—VI according to FIG. 3; and

FIG. 5 is a section V—V according to FIG. 3.

DETAILED DESCRIPTION OF THE PREFERRED EMBODIMENT

Figure 1:
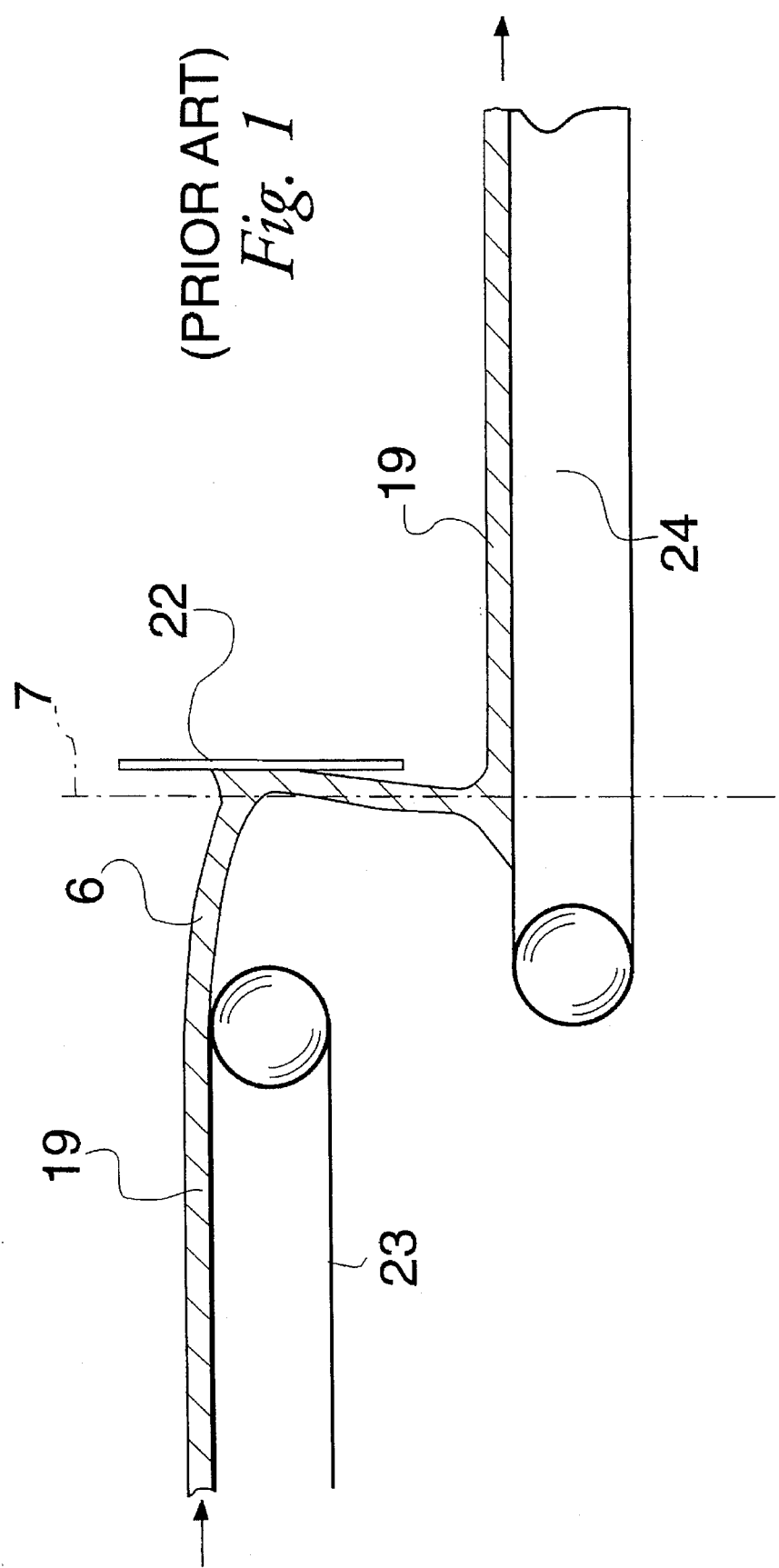
FIG. 1 is a section through a pivoting transfer device at two belt conveyors according to the state of the prior art.

According to FIG. 1, bulk material 19 is conveyed on a (feeding) first belt conveyor 23. The bulk material 19 leaves the belt conveyor 23 at the discharge drum, and it falls as a jet of bulk material 6 along a ballistic curve against a baffle plate 22, from which it falls off in free fall, to reach the second belt conveyor 24 possibly at the point at which the vertical pivot axis 7 intersects the carrying strand of the second belt conveyor 24. The bulk material 19 is accelerated to the speed of this belt conveyor in the direction of delivery.

Figure 2:
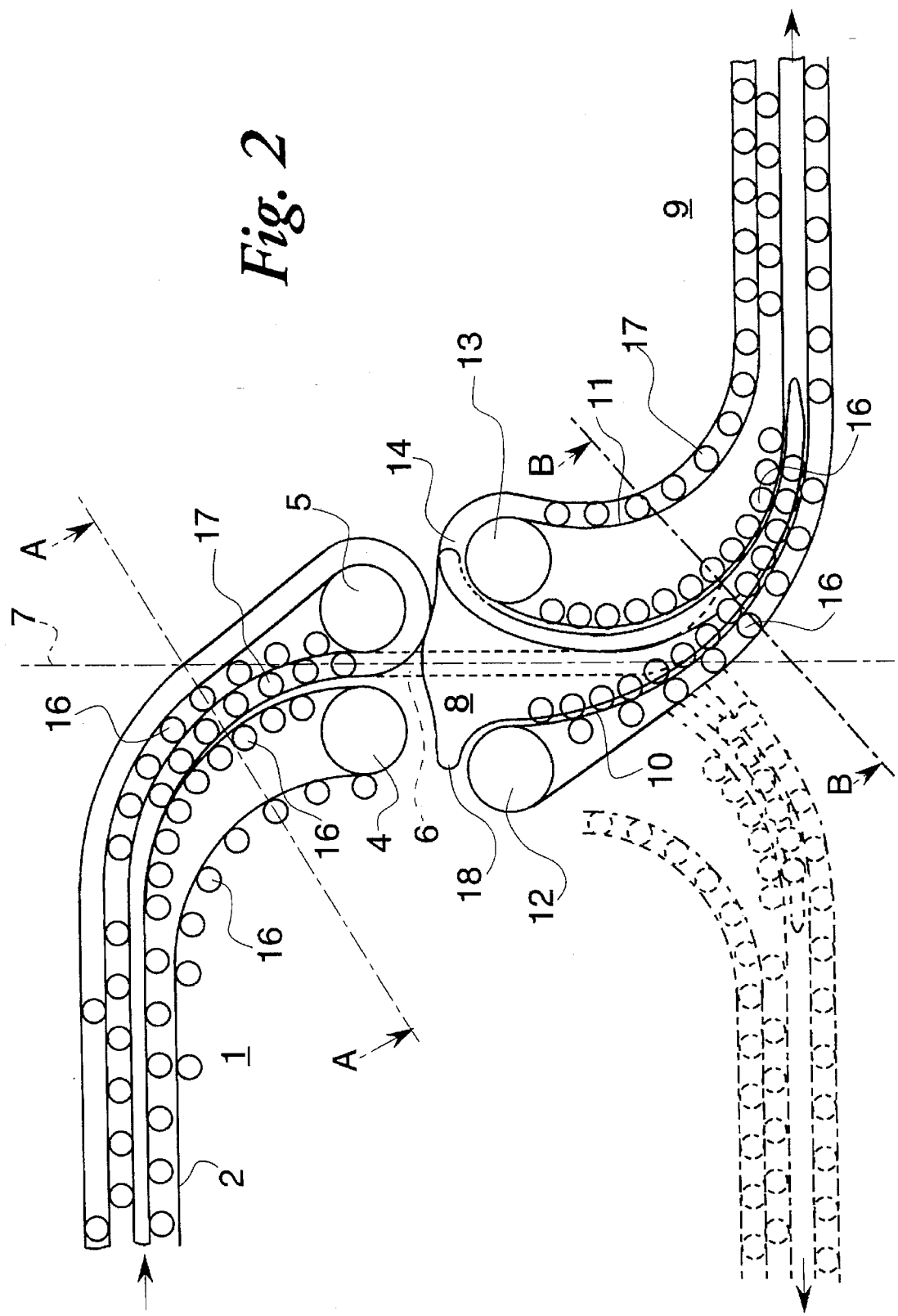
FIG. 2 is a section through a pivoting transfer device with a first belt conveyor located at a higher level.

FIG. 2 shows a pivotable bulk material transfer device according to the present invention with a first cover belt conveyor 1 arranged at a higher level and a second cover belt conveyor 9 arranged thereunder.

The bulk material being conveyed between the bottom belt 2 and the cover belt 3 of the first cover belt conveyor 1 is deflected in the end zone, until it leaves same between its two driven or non-driven tail pulleys 4, 5 as a free jet of bulk material 6. The center line of the jet of bulk material 6 forms, at the same time, the pivot axis 7, around which the two cover belt conveyors 1, 9 can be pivoted in relation to one another (see the phantom representation of second cover belt conveyor 9).

The free jet of bulk material 6 is narrow in the plane shown here, and it is limited by the contours indicated by broken lines. The jet of bulk material is broad in the plane that is parallel to the pulley axes, and it is limited by the width of delivery of the cover belt conveyor 1.

After leaving the upper cover belt conveyor 1, the jet of bulk material enters the receiving mouth 8 of a second cover belt conveyor 9 arranged at a lower level, which receiving mouth 8 is open in the upward direction. This receiving mouth 8 is formed by the bottom belt 10, the cover belt 11 and the two side walls 18. On its opening side, the receiving mouth 8 is at least as broad in both principal directions as the greater width of the jet of bulk material 6.

The receiving mouth 8 of the second cover belt conveyor 9 extends in an arc of, e.g., 90° and narrows in this area to the cross section of the normal delivery strand, which will then extend preferably at right angles to the vertical pivot axis 7.

FIG. 3 shows a similar pivotable bulk material transfer means from a first cover belt conveyor 1 to a second cover belt conveyor 9, in which the direction of delivery is, however, from the lower cover belt conveyor 1 to the upper cover belt conveyor 9. Such a delivery is possible if the speed of delivery is high enough, so that the jet of bulk material 6 in the second cover belt conveyor 9 is compressed and non-positively carried between its two belts 10, 11 before the bulk material is decelerated as a consequence of the force of gravity to the extent that it falls off in the downward direction within the receiving mouth 8.

As soon as parts of the jet of bulk material 6 reach the convexly curved cover belt 11 within the material-receiving mouth 8 of the second cover belt conveyor 9, the jet of bulk material 6 is deflected from the cover belt 11 and is pressed against the cover belt 11 by the centrifugal force. The bulk material 6 is accelerated to the speed of the cover belt conveyor 9 by the centrifugal force and by the coefficient of friction between the bulk material 6 and the cover belt 10.

FIG. 4 shows the cross section VI—VI through the first cover belt conveyor 1 in the area of the arc-shaped end piece.

The support rollers supporting the cover belt 3 in the straight area are not spring-mounted in the cover belt conveyors 1, 9 shown. The support rollers 17 are spring-mounted in the curved area, for here the bulk material 19 is pressed by the centrifugal force against the bottom belt 2. The bulk material 19 is carried in a non-positive manner in both areas.

The bottom belt is always a standard smooth conveyer belt in the cover belt conveyors 1, 9 shown. In arc areas of the cover belt conveyors, the concave strand charged with bulk material is supported by short support rollers 17 only at the edges of the belt. The bulk material 19 is pressed by the centrifugal force against the concavely curved strand, which is supported by long support rollers 16 on its side that is the outer side in the curve. If the belt-pulling force is not too strong, the corresponding belt remains flat in the transverse direction due to its curvature and to the bulk material 19 being pressed toward the outside as a consequence of the centrifugal force. If not, the corresponding belt is to be reinforced by transversely rigid inserts, which is frequently practiced, e.g., in corrugated edge belts.

FIG. 5 shows the cross section V—V through the second cover belt conveyor 9 in the area of the receiving mouth 8 curved in an arc-shaped pattern.

In the area of the receiving mouth, the rubber lips of the longitudinal beads 14 of the cover belt 11 slide on the outsides of the sickle-shaped side walls 18.

The bulk material 19 is pressed by the centrifugal force against the concavely curved carrying strand of the cover belt 11. This strand is supported by short support rollers 17 in its two edge areas only. If the belt-pulling force is not too strong, this cover belt 11 nevertheless remains flat in the transverse direction due to the curvature and to the bulk material 19 being pressed by the centrifugal force to the outside. If not, this cover belt 11 is to be reinforced by transversely rigid inserts.

The long support rollers 16 are fastened on both sides in the support structure 15, and the short support rollers 17 are fastened in the support structure 15 on one side and to a bracket 21 of the side walls 18 via a web 20, on the other side.

The two cover belt conveyors 1, 9 can be pivoted in relation to one another around the pivot axis 7. To do so, the support structure 15 of one of the two cover belt conveyors, which is not shown in detail in FIGS. 2–5 can be designed as a rigid support structure in the known manner, and the support structure of the other cover belt conveyor can be designed as a pivotable support structure. However, it is also possible to pivot both cover belt conveyors by means of prior-art bearings and pivoting drives, which are likewise not shown here and are concentric with the pivot axis 7.

While specific embodiments of the invention have been shown and described in detail to illustrate the application of the principles of the invention, it will be understood that the invention may be embodied otherwise without departing from such principles.

What is claimed is:

1. Pivoting transfer device for transfer of bulk material at a transfer area, at least part of the device pivoting around a pivot axis, the device comprising: a first cover belt conveyor with bottom belt with a bottom belt tail pulley and a cover belt with a cover belt tail pulley, said bottom belt tail pulley and said cover belt tail pulley being positioned adjacent to the bulk material transfer area; a second cover belt conveyor including a bottom belt with a tail pulley and a cover belt with a tail pulley, a receiving mouth formed by side walls in said bulk material transfer area, at least a portion of said first cover belt conveyor being deflected in an arc substantially equal to 90° such that a center of gravity line of a jet of raw material leaving said first cover belt conveyor is substantially the same as said pivot axis, said second cover belt conveyor defining an arc substantially equal to 90° in a transition beginning from said receiving mouth, at least one of said first cover belt conveyor and said second cover belt conveyor being pivotable in relation to the other of said first cover belt conveyor and said second cover belt conveyor, around said pivot axis.

2. Pivoting transfer means according to claim 1, wherein said first cover belt conveyor is arranged at a higher vertical level than said second belt conveyor.

3. Pivoting transfer means according to claim 1, wherein said first cover belt conveyor is arranged at a lower vertical level than said second cover belt conveyor.

4. Pivoting transfer means according to claim 2, wherein cover belts of said first cover belt conveyor and said second cover belt conveyor each include compressible beads, said compressible beads being connected to an associated belt and extending at an acute angle to the outside of said belt.

5. Pivoting transfer device according to claim 3, further comprising means for driving said first cover belt conveyor at a speed wherein said jet of bulk material will not come to a standstill within said receiving mouth of said second cover belt conveyor as a consequence of the force of gravity, whereby said jet of bulk material is prevented from falling back before said bulk material is caught between a bottom belt and a cover belt comprising said second cover belt conveyor and is carried in a non-positive manner.

6. Pivoting transfer device for transfer of bulk material at a transfer area, at least part of the device pivoting around a pivot axis, the device comprising: a first cover belt conveyor with bottom belt with a bottom belt tail pulley and a cover belt with a cover belt tail pulley, said bottom belt tail pulley and said cover belt tail pulley being positioned adjacent to the bulk material transfer area; a second cover belt conveyor including a bottom belt with a tail pulley and a cover belt with a tail pulley, a receiving mouth formed by side walls in said bulk material transfer area, at least a portion of said first cover belt conveyor being deflected in an arc such that a center of gravity line of a jet of raw material leaving said first cover belt conveyor is substantially the same as said pivot axis, said second cover belt conveyor defining an arc in a transition beginning from said receiving mouth, at least one of said first cover belt conveyor and said second cover belt conveyor being pivotable in relation to the other of said first cover belt conveyor and said second cover belt conveyor, around said pivot axis, said first cover belt being above said second cover belt.

7. Pivoting transfer device for transfer of bulk material at a transfer area, at least part of the device pivoting around a pivot axis, the device comprising: a first cover belt conveyor with bottom belt with a bottom belt tail pulley and a cover belt with a cover belt tail pulley, said bottom belt tail pulley and said cover belt tail pulley being positioned adjacent to the bulk material transfer area; a second cover belt conveyor including a bottom belt with a tail pulley and a cover belt with a tail pulley, a receiving mouth formed by side walls in said bulk material transfer area, at least a portion of said first cover belt conveyor being deflected in an arc such that a center of gravity line of a jet of raw material leaving said first cover belt conveyor is substantially the same as said pivot axis, said second cover belt conveyor defining an arc in a transition beginning from said receiving mouth, at least one of said first cover belt conveyor and said second cover belt conveyor being pivotable in relation to the other of said first cover belt conveyor and said second cover belt conveyor, around said pivot axis, said first cover belt being below said second cover belt.

8. Pivoting transfer device according to claim 7, further comprising means for driving said first cover belt conveyor at a speed wherein said jet of bulk material will not come to a standstill within said receiving mouth of said second cover belt conveyor as a consequence of the force of gravity, whereby said jet of bulk material is prevented from falling back before said bulk material is caught between a bottom belt and a cover belt comprising said second cover belt conveyor and is carried in a non-positive manner.

\* \* \* \* \*